United States Patent [19]

Trema

[11] Patent Number: 4,782,908
[45] Date of Patent: Nov. 8, 1988

[54] SUPPORTING DEVICE FOR A VEHICLE DRIVING WHEEL

[75] Inventor: Daniel Trema, Bezons, France

[73] Assignee: Elf France, Courbevoie, France

[21] Appl. No.: 76,301

[22] Filed: Jul. 22, 1987

[30] Foreign Application Priority Data

Aug. 1, 1986 [FR] France .................. 86 11189

[51] Int. Cl.⁴ .............................................. B60G 7/02
[52] U.S. Cl. ..................................... 180/227; 180/226; 280/286
[58] Field of Search ............... 280/688, 771, 277, 279, 280/282, 63, 284, 286; 180/71, 72, 217, 219, 227

[56] References Cited

U.S. PATENT DOCUMENTS

| | | | |
|---|---|---|---|
| 2,913,255 | 11/1959 | Courtney et al. | 280/277 |
| 3,971,571 | 7/1976 | Yoshioka | 280/277 |
| 4,479,661 | 10/1984 | Weigl | 280/279 |
| 4,553,622 | 11/1985 | De Cortanze | 180/227 |

FOREIGN PATENT DOCUMENTS

| | | |
|---|---|---|
| 2155732 | 5/1983 | France . |
| 2371 | of 1914 | United Kingdom . |
| 204883 | 10/1923 | United Kingdom . |

Primary Examiner—Richard A. Bertsch
Attorney, Agent, or Firm—Burgess, Ryan and Wayne

[57] ABSTRACT

Oscillating supporting device for the driving wheel of a vehicle comprising an arm parallel to the median plane of the wheel and pivotally mounted on the vehicle chassis trough a transverse shaft disposed at one end of the arm, by means of two bearings disposed in such a way that the median plane of the wheel is substantially situated at mi-distance thereof, the wheel being mounted on a rotation axle carried by the arm at its other end, the connecting shaft and rotation axle being parallel to each other, wherein the rotation axle is supported by two other bearings disposed on either side of the wheel, the first of which is integral with the arm and the second of which is carried by a link pivotally mounted on the arm, the internal cage of the second bearing being crossed through by the end of the rotation axle and blocked thereon by a removable fixing nut.

6 Claims, 1 Drawing Sheet

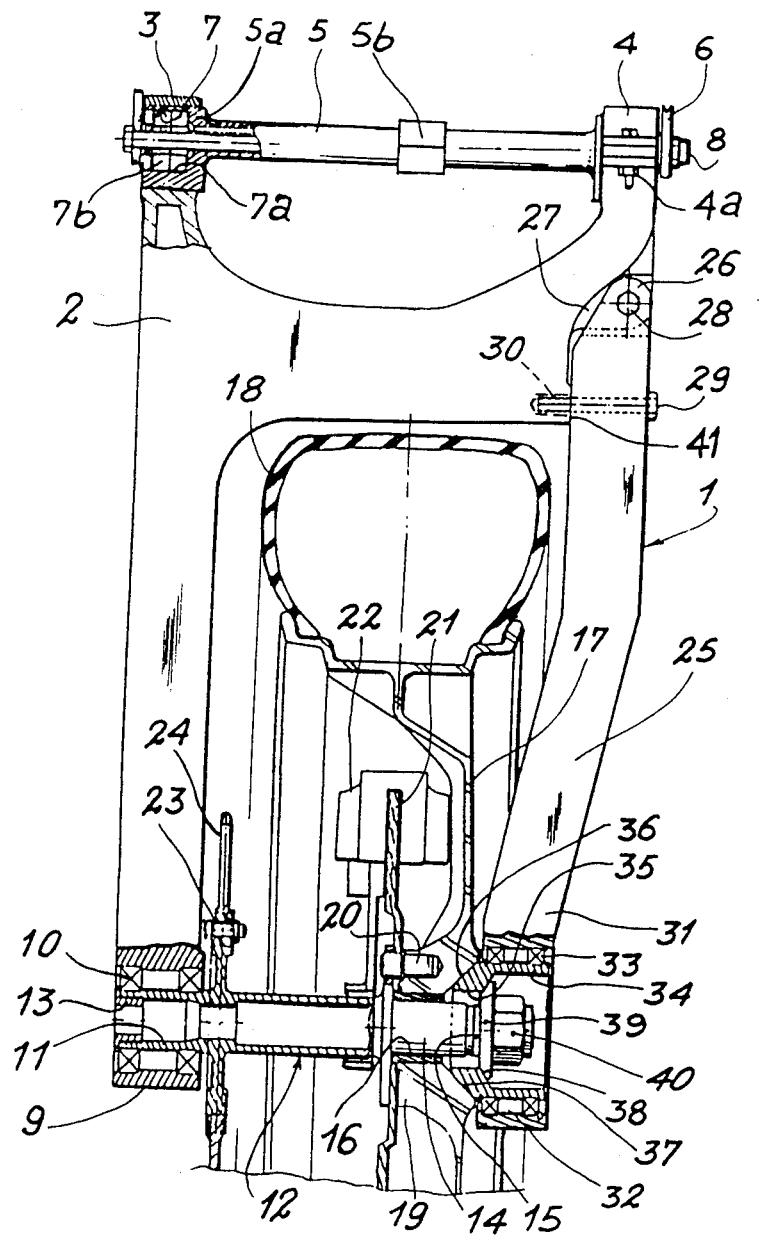

SUPPORTING DEVICE FOR A VEHICLE DRIVING WHEEL

FIELD OF THE INVENTION

Background of the invention

The present invention relates to a device for supporting a driving wheel of a vehicle, in particular a motorcycle driving wheel, which is pivotally mounted on a transverse shaft connecting said device to the chassis of this vehicle, the suspension of said vehicle being performed by oscillation about this axis against the action of an elastic system which is associated, on the one hand, to the chassis and, on the other hand, to the supporting device.

U.S. Pat. No. 4,553,622 has already described a device of this type in which the support has the general configuration of a U-shaped arm enveloping the rim of the wheel, which latter is disposed in such manner that its median plane extends at substantially equal distances from bearings which are disposed between the arm and the chassis and on which the connecting shaft rotates. The wheel is mounted on a rotation axle parallel to the connecting shaft, which crosses through the arm and turns on two other rigid bearings, this rotation axle being disposed at one of the ends of the U-shaped arm, whereas the connecting shaft is mounted on the other end of it.

This known device presents the advantage of tolerating any eventual alignment defects of the connecting shaft and a sprocket wheel carried by the chassis and controlling a wheel driving sprocket wheel wedged on the rotation axle of the wheel, while permitting the simple and rapid dismantling and assembling of said wheel. Furthermore, the mounting of the arm on the frame or chassis allows to limit the torsional moment of this arm under the effect of the reaction forces that are applied thereon by the wheel.

OBJECTS OF THE INVENTION

The aim of the present invention is to provide an improvement to the supporting device already disclosed by the above-mentioned patent, which allows in particular to avoid the cantilevered mounting of the wheel on the arm due to its U-shaped configuration and nevertheless facilitates removal of the wheel to change or repair it, while maintaining the other advantages of the known device such as set out herein-above, and in particular the possibility of driving the wheel by a chain transmission assembly comprising two pinions respectively integral with the axle of the wheel and the connecting shaft which is associated to the chassis and to which the arm is hinged.

SUMMARY OF THE INVENTION

For this purpose, the invention provides a device comprising an arm parallel to the median plane of the wheel and pivotally mounted on the vehicle chassis trough a transverse connecting shaft disposed at one end of the arm, by means of two bearings disposed in such a way that the median plane of the wheel is substantially situated at mi-distance thereof, the wheel being mounted on a rotation axle carried by the arm at its other end, the connecting shaft and rotation axle being parallel to each other, wherein the rotation axle is supported by two other bearings disposed on either side of the wheel, the first of which is integral with the arm and the second of which is carried by a link pivotally mounted on the arm, the internal cage of the second bearing being crossed through by the end of the rotation axle and blocked thereon by a removable fixing nut.

Due to this arrangement, the rotation axle of the wheel is supported on either side of the median plane by the arm and the link respectively, extending substantially in a direction parallel to this plane, which avoids any cantilevering without it being necessary to modify the mounting of the chain which connects a driving pinion wedged on the rotation shaft to a control pinion carried by the chassis or frame. In order to remove the wheel, the fixing nut can easily be removed, while the link is laterally pivoted to disengage completely the access to the wheel and thereby allow it to be withdrawn.

According to one particular feature of the device of the invention, the pivoting link is hinged on the arm by being pivotally mounted on an axle perpendicular to the connecting shaft and to the rotation axle and comprises a locking pin adapted to penetrate, in position of displacement of the link, a housing provided in the arm where its end carrying the cage of the second bearing is crossed through by the rotation axle.

Advantageously, the cage of the second bearing comprises a central bore for the passage of the rotation axle and is blocked against the hub of the wheel by a transverse flange, intergral with the fixing nut. According to a complementary feature, the flange preferably presents one face inclined resting against an abutment having a corresponding outline provided on the side of the cage, while the opposite face of the cage is pressed against a conically shaped recess provided in the wheel hub, coaxially to the axle of rotation.

According to another embodiment of the invention, the transverse connecting shaft comprises ends that are eccentered with respect to said shaft, and each of which is pivotally mounted in a corresponding bore of the arm, the angular position of which with respect to the arm is adjustable inside this bore in order to adjust the tension of a wheel driving chain and which are adapted to be blocked in position inside this bore by blocking means.

BRIEF DESCRIPTION OF THE DRAWING

Other objects, features and aims of this invention related to a support device of a driving wheel of a vehicle, especially a motorcycle driving wheel, will become apparent from the following description of an embodiment, given by way on non-limitative illustration, with reference to the appended drawing the single FIGURE of which represents schematically a cross-sectional partial view of the supporting arm and of the wheel carried by said arm.

In this FIGURE, reference numeral generally 1 designates the device of the present invention, comprising mainly an arm 2 provided at one end with two bosses 3 and 4 between which extends a connecting axle 5 that connects the arm to the chassis 6 of the vehicle. Each of the bosses 3 and 4 presents an internal bore 7 in which pivots the enlarged end 5a of the axle 5. Inside each end 5a is provided a bore 7a centered on the axle 5 and eccentric with respect to the bore 7 and in which are mounted bearings 7b integrally connected by a mounting axle 8 to chassis 6 of the vehicle. After adjusting the tension of the transmission chain, through rotation of the connecting axle 5 from an engagement profile such as 5b, the ends 5a are pressed and maintained in position with respect to the respective bosses 3 and 4a, by screwing bolts or corresponding clamping screws such as 4a, which press the slots of the bosses 3 and 4 at these ends 5a.

At its end 9 opposite the bosses 3 and 4, the arm 2 supports a first bearing 10 in which pivots the end 11 of a hollow axle 12, sealed by a screw stopper 13. At its opposite end, the axle 12 comprises a threaded portion 15 and supports, through the means of a ring 16 the wheel 17 of the vehicle, on the outside of which is mounted the tire 18. Surrounding the axle 12, the wheel 17 comprises a hub 19, connected to this axle by means of the heads of screws 20 which also connect it to a brake disk 21, adapted to cooperate with a brake caliper 22 according to an arrangement known per se in this type of vehicle. Furthermore, the axle 12 supports adjacent to the end 9 of the arm 2, connecting means 23 for connecting it to a chain pinion 24 adapted to allow the axle 12 and thus the wheel to be driven under the effect of a driving sprocket wheel (not represented) carried by the chassis.

According to the invention, the supporting arm 2 is associated to a swinging link 25, comprising at one end a fork 26 hinges on a lug 27 laterally protruding from the arm 2. The link 25 is hinged about an axle 28 that extends perpendicularly to the direction of the axles 5 and 12, respectively. Furthermore, it carries a locking split pin 29, adapted to be engaged when the link is in a folded position such as illustrated in the figure, in a recess 30 provided opposite the arm 2.

At its end 31 opposite the axle of articulation 28, the link 25 comprises a housing 32 inside of which is mounted a second bearing 33 comprising an internal cage or ring 34. This latter presents an axial bore 35 through which extends the threaded portion 15 of the axle 12 and is advantageously shaped so as to present an external conical abutment 36 resting against an abutment having the same outline 37 provided in the hub 19 of the wheel. The bore 35 can have an oblong cross-section and must in any event be provided with an opening that is sufficiently large to receive the threaded portion 15 of the hollow axle 12 during swinging of the link 25 pivoting about the axle 28. The securing of the cage 34 against the hub 19 is effected by a flange 39 pressed against a corresponding portion 38 of the cage, this flange being itself integral with a securing nut 40 screwed onto the threaded portion 15 of the axle 12. Upon screwing of the nut 40, the arm 25 engages the bearing surface 41 provided in the zone of the recess 30 on the axle 2 and is slightly bent away from this bearing surface 41. When the hinge of the link 25 on the axle 28 is sufficiently rigid, it is possible to omit the locking split pin 29 and its recess 30, the pressing on the shoulder 41 being sufficient to imbed the link 25 on the arm 2.

A swinging device for supporting the driving wheel of a vehicle is thus obtained in which the axle of rotation 12 of this wheel is supported by two bearings, 10 and 33, respectively mounted at each of its ends and each corresponding to a bearing of the connecting shaft 5 for connection with the chassis, thereby avoiding any overhang of the wheel. In order to remove the wheel, it is sufficient to unscrew the nut 40 so as to free the cage 34 at the end of the swinging link 25, said link being thereafter swung about its axle 28 so as to allow immediate access to the wheel.

Furthermore, it is obvious from the description hereinabove of the more specifically envisaged disposition that the novel structure does not jeopardize the improvements and advantages already obtained by the device described in U.S. Pat. No. 4,553,622 cited hereinabove, but on the contrary contributes thereto particular complementary advantages, due specifically to the presence of the link 25 which allows to ensure supporting the wheel axle in a safer and more reliable manner, by preventing said axle from being subjected to prejudicial stresses during the operation of the vehicle.

It is well understood that the present invention is in no way limited to the embodiment described hereinabove but encompasses any variants thereof which may be envisaged by those skilled in the related art without in any way departing from the scope and spirit of the invention.

What is claimed is:

1. A supporting device for the rear driving wheel of a motorcycle of the type having a chassis, said device comprising:
    a wheel supporting arm having a first end pivotably mounted on the chassis through a transverse axle, and having a second end;
    a swinging link hingedly mounted on said arm, said swinging link having an internal ring with a conical abutment;
    a rotatable wheel axle at the second end of said arm for supporting a wheel hub of the rear driving wheel for rotation;
    first bearing means at the second end of said arm for rotatably supporting one end of said wheel axle;
    second bearing means at one end of said swinging link for rotatably supporting the opposite end of said wheel axle through said internal ring;
    said internal ring of said swinging link is crossed through by the opposite end of the wheel axle; and
    securing nut means screwed on said opposite end of said steel axle for pressing said conical abutment between the wheel hub and the securing nut means so as to block the internal ring on said wheel axle.

2. A supporting device according to claim 1, wherein the swinging link is hinged on the arm about an axis substantially perpendicular to a plane containing the transverse axle and the wheel axle.

3. A supporting device according to claim 1, wherein the swinging link comprises a locking pin adapted to penetrate, in a folded position of the link, in a recess provided in the arm.

4. A supporting device according to claim 1, wherein the internal ring comprises a central bore for the passage of the wheel axle and is blocked against the hub of the rear wheel by a transverse flange of the securing nut means.

5. A supporting device according to claim 4, wherein the flange has an inclined face abutting a bearing surface having the same profile, said bearing surface provided on one side of said internal ring, the opposite side of said internal ring being pressed against a conically shaped recess provided in the hub of the rear wheel coaxially with the wheel axle.

6. A supporting device according to claim 1, wherein the transverse axle comprises ends that are eccentrically mounted in said arm, each of said ends turning in a corresponding bore of the arm and the angular position thereof inside the bore of the arm being adjustable in order to control the tension of a wheel driving chain and being adapted to be blocked in position inside this bore by blocking means.

* * * * *